Aug. 28, 1934.    C. W. KANOLT    1,972,019
OPTICAL OBJECTIVE SYSTEM
Filed Nov. 29, 1930    2 Sheets-Sheet 1
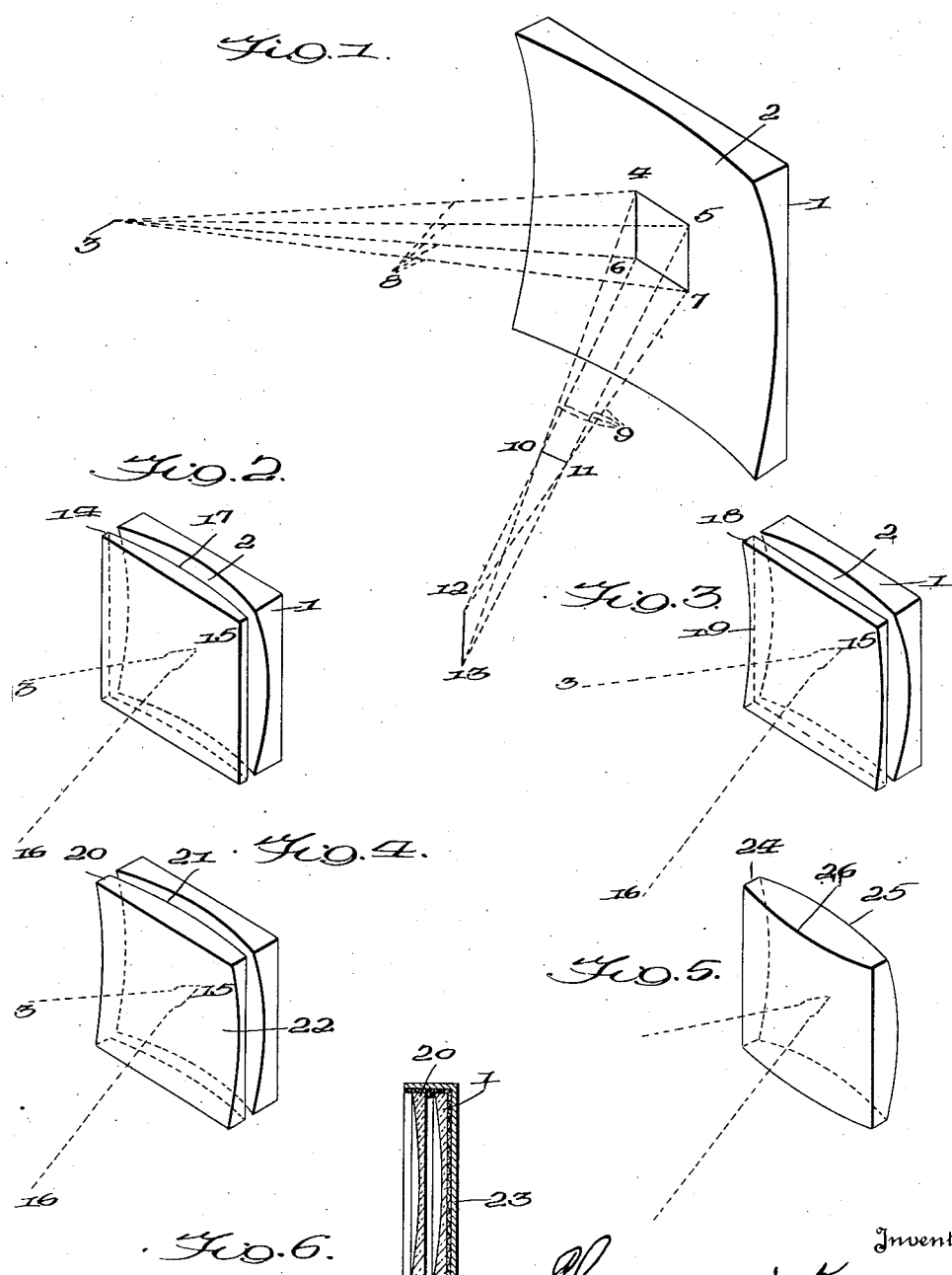

Aug. 28, 1934.     C. W. KANOLT     1,972,019
OPTICAL OBJECTIVE SYSTEM
Filed Nov. 29, 1930     2 Sheets-Sheet 2
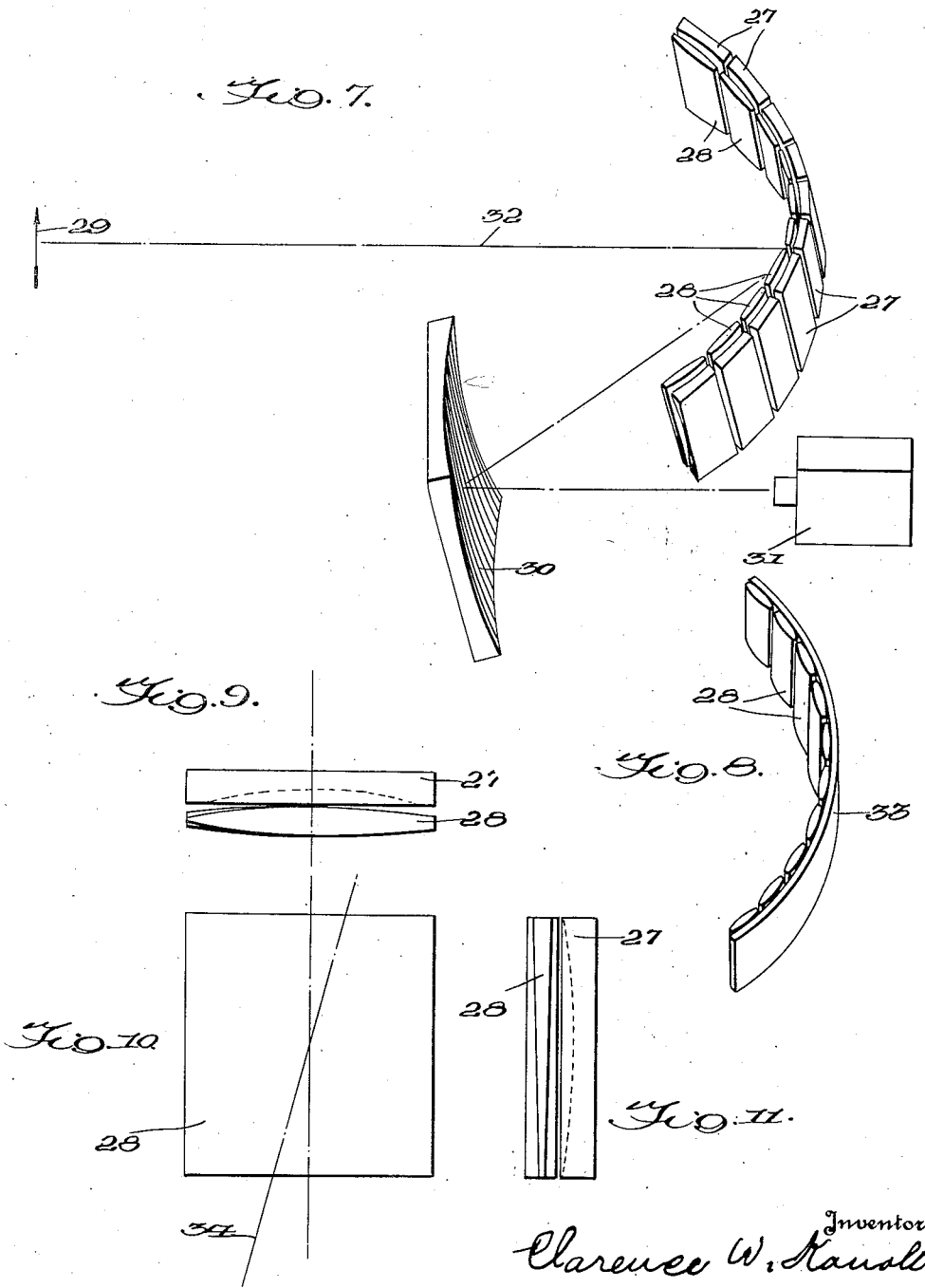

Patented Aug. 28, 1934

1,972,019

UNITED STATES PATENT OFFICE 1,972,019

OPTICAL OBJECTIVE SYSTEM

Clarence W. Kanolt, New York, N. Y.

Application November 29, 1930, Serial No. 499,077

4 Claims. (Cl. 95—18)

This invention relates to an improvement in optical objective systems, and is designed for use primarily in connection with the production of stereoscopic pictures, such for instance as is set forth in my prior application Serial No. 462,006, filed June 18, 1930.

The device set forth in that application includes an objective system comprising an assemblage of concave mirrors in the production of stereoscopic pictures.

In order that the ribbed mirror, upon which this objective system forms an image, shall not intercept the rays of light passing from the object photographed to the objective system, the mirrors of the objective system are inclined, so as to reflect light at an angle; that is, they are inclined so that the incident rays and the reflected rays make a considerable angle to the direction perpendicular to the mirror surface.

A mirror used in this manner is capable of giving a sharp image over a limited area if the mirror surface has the form of a suitable eccentric section of an ellipsoid or a paraboloid. However, it is difficult and expensive to produce accurately mirrors of such forms, and it is therefore desirable to be able to use mirrors having spherical surfaces, which are more easily produced.

If a concave mirror having a spherical surface is used to reflect light at an angle, as is described, the image produced will be astigmatic and therefore imperfect.

It is therefore the object of this invention to provide for correcting this astigmatism and permitting the formation of a clear image by the objective system used in the production of stereoscopic pictures.

This is accomplished by placing a convex or concave cylindrical lens in front of the concave spherical mirror and passing the rays of light through the lens to the reflecting surface, which effectively corrects the astigmatism of the mirror and makes it possible to obtain clear images.

In the accompanying drawings:

Fig. 1 is a perspective view of a concave spherical mirror showing diagrammatically the incident and reflected rays of light;

Fig. 2 is a similar view with a convex cylindrical lens in front of the mirror;

Fig. 3 is a similar view showing the use of a concave cylindrical lens;

Fig. 4 is a similar view showing the use of a concavo-convex lens;

Fig. 5 is a perspective view showing the reflector and lens made in one piece;

Fig. 6 is a vertical sectional view of a casing enclosing the lens and mirror;

Fig. 7 is a diagrammatic view of the apparatus for producing stereoscopic pictures with this invention applied thereto;

Fig. 8 is a detail perspective view showing the use of a series of lenses with a single mirror;

Fig. 9 is a plan view of a concave mirror and a cylindrical lens, in which the axis of the lens is inclined out of the vertical; and Figs. 10 and 11 are respectively face and edge views of the same.

Referring to Fig. 1, a concave mirror is designated generally by the numeral 1 and has a spherical reflecting surface 2. In this figure is illustrated the manner in which rays of light are reflected by a concave spherical mirror.

For simplicity the light from a single point 3 of an object in front of the reflector, and the reflection of the incident rays 8 from point 3 by a small rectangular area 4, 5, 6, 7 of the mirror surface 2 will be considered.

For the purpose of illustration, the incident and reflected rays 8 and 9 are shown as forming the corners of the area 4–7.

After being reflected, the light rays are brought to a focus along a line 10, 11, which is perpendicular to the plane containing the incident and the reflected rays 8 and 9. As the reflected rays progress further, they will come to a focus upon a line 12, 13, which is in the plane containing the incident and reflected rays. The rays will nowhere come to a focus at a point.

In Figs. 1 to 5, the plane of incidence is considered to be vertical.

If $p$ represents the distance from the point source of light 3 to the element of the mirror surface 4–7, which element is very small; $q_1$ represents the distance from this element 4–7 to the line 10, 11; $q_2$ represents the distance from the mirror element to the line 12, 13; $a$ represents the angle which the incident ray makes to a line perpendicular to the element of the mirror surface; and $r$ represents the radius of curvature of the mirror surface, then the following relations exist between these quantities:

$$\frac{1}{p} + \frac{1}{q_1} = \frac{2}{r \cos a}$$

$$\frac{1}{p} + \frac{1}{q_2} = \frac{2 \cos a}{r}$$

These facts are known to persons familiar with the designing of optical apparatus.

In order to overcome this difficulty and to make it possible to obtain clear images, I correct the astigmatism of a mirror by means of a lens placed adjacent to its face, one or both surfaces of the lens being cylindrical in form. Some of the ways in which this may be done are shown in Figs. 2 to 5 inclusive.

In Fig. 2 the concave mirror 1 has a spherical reflecting surface 2, and a convex cylindrical lens 14 is located in front of this reflecting surface 2 with the cylindrical axis of the lens lying in the plane represented by the dotted line 3—15—16 of the incident and reflected rays at the center of the mirror. The cylindrical lens should be of such focal length that the focal line 10, 11 of Fig. 1 will be shortened to a point. A clear image will then be formed at this position. While the lens 14 is shown with one surface 17 convex, yet either or both surfaces may be convex, as desired.

In Fig. 3, a concave cylindrical lens 18 is located in front of the concave mirror 1 and has the surface 19 concave and turned away from the reflecting surface 2 of the mirror.

The cylindrical axis of the lens is at right angles to the plane 3—15—16 of the incident and reflected rays. The concave cylindrical lens should be of such focal length that the focal line 12, 13 of Fig. 1 will be shortened to a point. A clear image will then be formed at this position.

In the device shown in Fig. 3, the required focal length may be obtained by making either or both faces of the lens concave.

In Fig. 4, the lens 20 has one face 21 formed of a cylindrical convex surface with its axis in the plane 3—15—16 of the incident and reflected rays, and the other surface 22 of the lens is a concave cylindrical surface with its axis at right angles to this plane. The lens 20 may be employed to bring the rays of light represented in Fig. 1 to a focus at a point intermediate the line 10, 11 and the line 12, 13, shown in Fig. 1.

If $L_1$ represents the focal length of the convex face 21 of the lens 20, as shown in Fig. 4; $L_2$ the focal length of the concave face 22; and $q$ the distance of the image from the mirror, these quantities are then related approximately by the equations:

$$\frac{1}{p}+\frac{1}{q}=\frac{2\cos a}{r}+\frac{1}{L_1}$$

$$\frac{1}{p}+\frac{1}{q}=\frac{2}{r\cos a}-\frac{1}{L_2}$$

By means of these equations, the required values of $L_1$ and $L_2$ for specified values of $p$, $q$, $r$, and $a$ can be calculated.

In the drawings, the curvature of the lenses is exaggerated for the sake of clearness. Only very slight curvature would be required ordinarily, and the lenses may be made thin. Under these conditions, the chromatic aberration will be very slight. A chromatically corrected lens consisting of two or more pieces of glass may be employed if desired.

In utilizing one of the arrangements of cylindrical lenses and mirrors shown in Figs. 2, 3 and 4, the mirror and lens should be mounted together in a box, such as represented by the numeral 23 in Fig. 6, and which extends over and covers the edges of both the lens and the mirror, and if desired the back of the mirror but leaving the front face of the lens exposed. This box 23 serves to keep dirt from between the lens and the mirror and will diminish the tendency of the surface of the mirror to tarnish, and for this purpose the box should be made approximately air-tight.

In the form of the invention shown in Fig. 5, the lens and mirror are made of a single piece of glass and are designated as a whole by the numeral 24. The rear surface 25 is formed spherically convex and is silvered to form a concave reflector for light entering from the front. The front surface 25 is cylindrical and is not silvered, and it thus forms the cylindrical lens. It may be convex with its axis in the plane of incidence, as shown in Fig. 2, or it may be concave with its axis at a right angle to the plane of incidence such as the lens shown in Fig. 3. The form of the invention shown in Fig. 5, would produce more chromatic aberration than those shown in Figs. 2, 3 and 4.

In Fig. 7, the invention is shown as applied to an objective system used in the production of stereoscopic pictures, such as is illustrated and described in my former application Serial No. 462,006, filed June 18, 1930.

In this system, the concave mirrors are designated by the numeral 27, each of which is provided with a cylindrical correcting lens 28. The object to be photographed is designated by the numeral 29 and the curved and ribbed or grooved mirror is designated by the numeral 30, while the camera is shown at 31. The dotted line 32 shows diagrammatically the course of light passing from the object 29 through one of the correcting lenses 28 to a mirror 27 in the center of the system, from where it is reflected onto the curved and ribbed or grooved mirror 30 and is again reflected to the lens of the camera 31, as described more fully in my former application Serial No. 462,006.

If desired, a single objective mirror 33 may be employed, as shown in Fig. 8, with a plurality of cylindrical lenses to correct its astigmatism.

The objective system should be designed to give the best optical results for a source of light directly in front of the apparatus and at about the average distance, at which the most important of the objects to be photographed will be from the camera.

For sources of light in other positions, the correction of the astigmatism of the mirrors by the cylindrical lenses will not usually be perfect, but the results will be better than would be obtained without the correcting lenses.

For an objective mirror in the center of the objective system, the plane of incidence for a ray of light from the object in Fig. 7 directly in front of the apparatus will be vertical, and if convex lenses are used, as in Fig. 7, the cylindrical axis of the lens of this central mirror should be vertical. For other mirrors not in the center of the system, the plane of incidence of light from the same source will not be quite vertical, as shown in Figs. 9 to 11. The correcting lenses in these positions should be inclined so that the cylindrical axis designated by the line 34 in Fig. 10 is in the plane of incidence at the position of each lens.

I claim:

1. In a system of the character described, the combination of means for reproducing an image, a plurality of curved reflecting surfaces for directing light to said reproducing means, and a plurality of cylindrical lenses associated with the reflecting surfaces in position for correcting the astigmatism thereof.

2. In an apparatus for the production of stereoscopic pictures, the combination of a camera, means for diverting light rays to the camera, a plurality of curved reflecting surfaces for focusing light on the diverting means, and a plurality of cylindrical lenses associated with said reflecting surfaces for correcting the astigmatism thereof.

3. In an apparatus for the production of stereoscopic pictures, the combination of a camera, a ribbed element for diverting light rays to the camera, a plurality of spherical reflecting surfaces for focusing light on the ribbed element, and a cylindrical lens arranged in front of each of said reflecting surfaces for correcting the astigmatism thereof.

4. In an apparatus for the production of stereoscopic pictures, the combination of means for reproducing images, means for directing light rays to said reproducing means, a plurality of curved reflecting surfaces for focusing light on said directing means, and a plurality of cylindrical lenses associated with said reflecting surfaces for correcting the astigmatism thereof.

CLARENCE W. KANOLT.